Patented Jan. 2, 1934

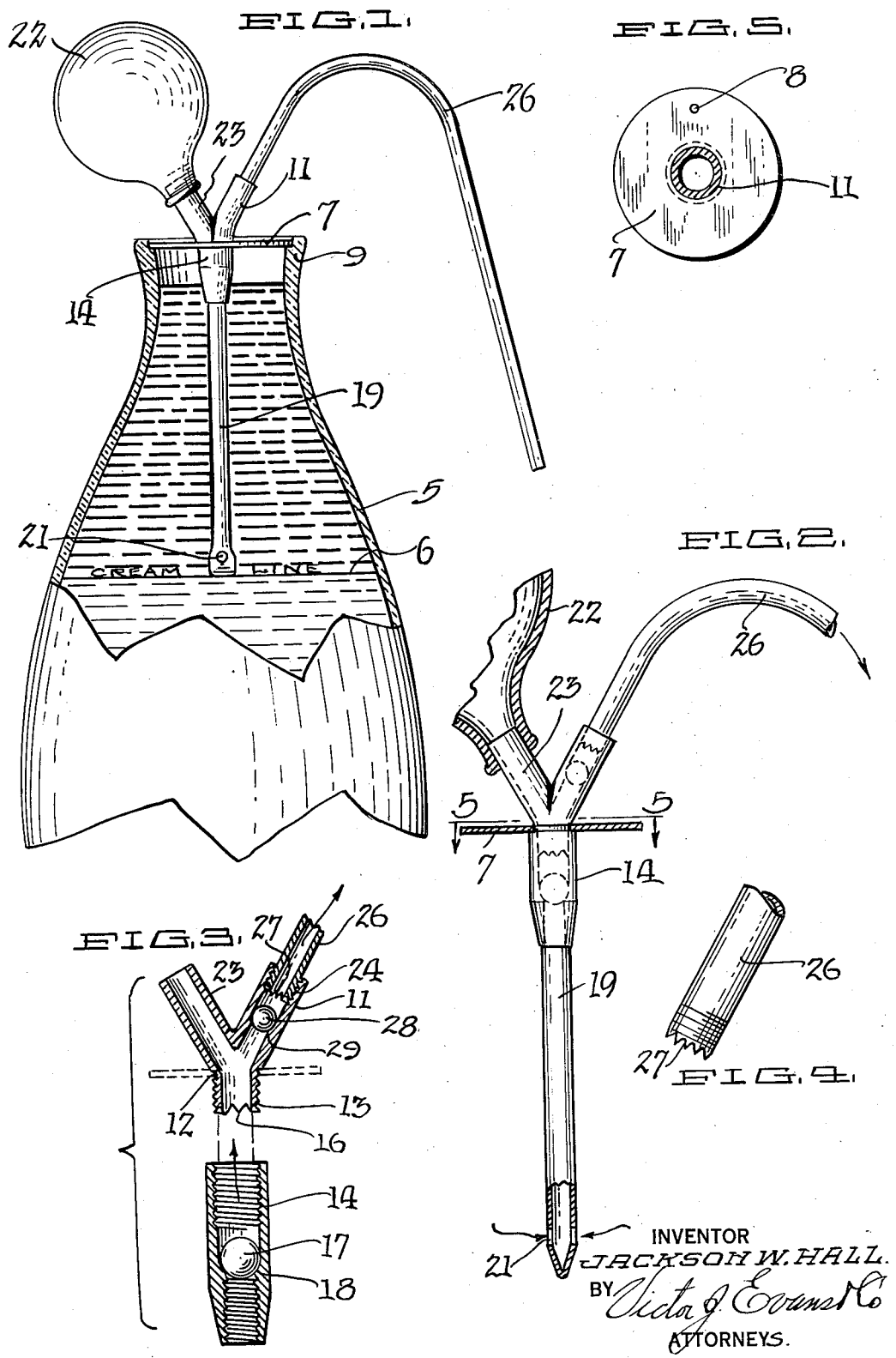

1,941,859

UNITED STATES PATENT OFFICE 1,941,859

CREAM SEPARATOR

Jackson W. Hall, San Francisco, Calif.

Application April 11, 1933. Serial No. 665,595

1 Claim. (Cl. 137—20)

This invention relates to improvements in creamers and has particular reference to a device for removing cream from the top of a standard milk bottle.

A further object is to produce a device which is economical to manufacture.

An additional object is to produce a device which may be readily cleaned.

A still further object is to produce a device wherein only the cream will be taken from the bottle, and one which will not create currents which would otherwise mix the cream with the milk.

Other objects and advantages will be apparent during the course of the following description.

In the accompanying drawing forming a part of this specification and in which like numerals are employed to designate like parts throughout the same, Fig. 1 is a fragmentary view of an upper portion of a milk bottle shown in cross section and having my invention positioned in the top of the bottle, Fig. 2 is a fragmentary detail view disclosing the construction of my device, Fig. 3 is a fragmentary view showing the position of the valves within the tube, Fig. 4 is a fragmentary side elevation of the discharge tube showing the serrated edge, and Fig. 5 is a cross sectional view on the line 5—5 of Fig. 2.

Due to the fact that milk is ordinarily bottled several hours before delivery or consumption, sufficient time elapses for the cream to separate and rise to the top of the bottle. This separation forms what is commonly known as a cream line and a considerable distance below the top of the bottle, and due to standardization this cream line seldom varies to any marked extent. Applicant has therefore, provided means for removing the cream from the top of the bottle down to the cream line, without agitating the contents of the bottle, which would cause a mixture of the cream and milk.

In the accompanying drawing wherein for the purpose of illustration is shown a preferred embodiment of my invention, the numeral 5 designates an ordinary milk bottle, the numeral 6 the line separating the cream and the milk, commonly termed the cream line. At 7 I have shown a plate corresponding to the ordinary milk bottle cap and adapted to rest upon the ledge 9 ordinarily occupied by the cap. Positioned above and extending through this plate 7 is a Y-shaped fitting 11. This Y-shaped fitting has a shoulder 12 and is externally threaded as at 13, which extends through the plate 7 and engages a threaded fitting 14. The extremity of the externally threaded end is serrated as shown at 16 so as to prevent a ball 17 from sealing the externally threaded end as will be later described. This ball 17 rests upon a seat 18. An intake tube 19 is secured to the bottom of the fitting 14. This intake tube has ports 21 formed on opposite sides thereof and at a point above the cream line when the device is inserted in the bottle as shown in Fig. 1.

A bulb 22 is attached to the portion 23 of the Y-shaped member 11. The opposite end of this Y-shaped member is internally threaded as shown at 24 so as to receive a threaded end of a siphon tube 26. This threaded end of the siphon 26 is also serrated as shown at 27 (see Figs. 3 and 4). This prevents a check ball 28 from closing this tube as will be later described. This check ball 28 rests upon a seat 29, the purpose of which will be later seen.

Assuming now that the device is placed in a bottle, as shown in Fig. 1, and the bulb 22 is pressed, air within the bulb will be passed downwardly through the portion 23 of the Y-shaped member, will contact the ball 17 resting upon its seat 18 and therefore as it cannot escape downwardly this air will raise the valve 28 off of its seat and will then pass through the pipe 26. Due to the fact that the end of the pipe 26 is serrated, it will be impossible for the ball to seat itself against the end of the pipe, and thus close off the escape for the air. As soon as the air has been forced out of the ball and released, cream will be sucked in through the ports 21 as indicated by the arrows of Fig. 2, will pass upwardly past the valve 17 and into the ball 22. The ball check 28 at this time resting against its seat, will prevent any air being sucked into the ball. By now pressing upon the ball again the cream will be forced out through the siphon pipe 26 in the same manner as the air was forced out and due to the siphon action of the pipe 26 the cream will continue to flow until the same falls below the ports 21 and permits air to break the siphon action.

In order to clean the device, it will be apparent that the pipe 19 may be inserted in hot water, the bulb 22 pressed to force the water through the parts to thoroughly clean the same. The opening 8 in the cap permits air to enter the bottle as the cream is being withdrawn.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

In a cream separator of the character described, a Y-shaped member having an externally threaded portion, a supporting disc positioned on said threaded portion, said disc contacting a shoulder formed on said Y-shaped member, a fitting threadedly secured to said Y-shaped member, a check valve positioned in said fitting, an intake pipe secured to said fitting, ports formed in said intake pipe, said ports being horizontally positioned with respect to the axis of said pipe, a siphon pipe having a serrated end secured to said Y-shaped member, a valve carried in said Y-shaped member and adapted to engage the serrated end of said siphon pipe, and a bulb secured to the other leg of said Y-shaped member, whereby a flow of liquid may be caused between said intake pipe and said siphon.

JACKSON W. HALL.